US008250580B2

(12) United States Patent
Chen et al.

(10) Patent No.: US 8,250,580 B2
(45) Date of Patent: Aug. 21, 2012

(54) MULTI-CORE SOC SYNCHRONIZATION COMPONENT

(75) Inventors: Tien-Fu Chen, Chia-Yi (TW);
Wei-Chun Ku, Chia-Yi (TW);
Chi-Neng Wen, Chia-Yi (TW)

(73) Assignee: National Chung Cheng University, Chia-Yi (TW)

( * ) Notice: Subject to any disclaimer, the term of this patent is extended or adjusted under 35 U.S.C. 154(b) by 868 days.

(21) Appl. No.: 12/366,699

(22) Filed: Feb. 6, 2009

(65) Prior Publication Data
US 2010/0107167 A1 Apr. 29, 2010

(30) Foreign Application Priority Data
Oct. 24, 2008 (TW) .............................. 97140978 A

(51) Int. Cl.
*G06F 9/52* (2006.01)
(52) U.S. Cl. ......................................... 718/102; 710/40
(58) Field of Classification Search .................. None
See application file for complete search history.

(56) References Cited

U.S. PATENT DOCUMENTS

| | | | | |
|---|---|---|---|---|
| 6,334,159 B1 * | 12/2001 | Haupt | ................. | 710/6 |
| 6,401,149 B1 * | 6/2002 | Dennin et al. | ................. | 710/58 |
| 6,421,741 B1 * | 7/2002 | Minyard | ................. | 713/375 |
| 7,814,243 B2 * | 10/2010 | Hamilton | ................. | 710/52 |
| 7,984,242 B2 * | 7/2011 | Collard et al. | ................. | 711/125 |
| 7,984,268 B2 * | 7/2011 | Hass et al. | ................. | 712/214 |
| 2004/0143712 A1 * | 7/2004 | Armstrong et al. | ........... | 711/152 |
| 2005/0251639 A1 * | 11/2005 | Vishin et al. | ................. | 711/168 |
| 2006/0212868 A1 * | 9/2006 | Takayama et al. | ............ | 718/100 |
| 2007/0124728 A1 * | 5/2007 | Rosenbluth et al. | .......... | 718/100 |
| 2007/0220517 A1 * | 9/2007 | Lippett | ................. | 718/102 |

OTHER PUBLICATIONS

David Andres et. al., Implementing the Thread Programming Model on Hybrid FPGA/CPU Computational Components, 10th International Symposium, Feb. 14, 2004, Madrid, Spain.
Paolo Gai et. al., Support for multiprocessor synchronization & resource sharing in System-On-Programmable Chips with SoftCores, 2005 IEEE.
Bo-Cheng Charles Lai et. al., A light-Weight Cooperative Multi-threading with Hardware Supported Thread-Management on an Embedded Multi-Processor System, 2005 IEE.
Jaehwan Lee et. al., A Novel Deadlock Avoidance Algorithm & Its Hardware Implementation, CODES+ISSS' 04, Sep. 8-10, 2004, Stockholm, Sweden.
Pun H. Shiu et. al., A Novel Parallel Deadlock Detection Algorithm & Architecture, Georgia Tech Apr. 2001.

* cited by examiner

*Primary Examiner* — Eric Coleman
(74) *Attorney, Agent, or Firm* — Ming Chow; Sinorica, LLC

(57) ABSTRACT

A multi-core SOC synchronization component comprises a key administration module, a thread schedule unit supporting data synchronization and thread administration, and an expansion unit serving to expand the memory capacity of the key administration module. The key administration module stores, distributes and manages keys. When the key is assigned to a data synchronization process, the key administration module supports the data synchronization process. When the key is assigned to a thread process, the thread schedule unit performs thread administration. The expansion unit is coupled to an external memory and able to expand the memory of the key administration module. When the keys are expanded or the internal memory is insufficient, the keys are stored in the external memory.

12 Claims, 8 Drawing Sheets

MULTI-CORE SOC SYNCHRONIZATION COMPONENT

BACKGROUND OF THE INVENTION

1. Field of the Invention

The present invention relates to an SOC technology, particularly to a multi-core SOC synchronization component.

2. Description of the Related Art

In a computer system, different units usually intend to access an identical piece of data synchronously. It also occurs frequently that the execution sequence of two or more programs or processes depends on the contents of an identical piece of data. The synchronization problem of two different processes may be discussed from the views of the common processor architecture and the embedded system architecture.

In the common processor architecture, such as the IntelX86, software, i.e. the operating system, handles the synchronization problem. When an operating system handles the data synchronization problem or manages the schedule of different processes, some tasks must be undertaken exclusively. In other words, only a single process is allowed to access/process a data variable or a series of steps at a time. The operating systems have several approaches to solve the synchronization problem. For example, the Linux adopts the methods of shared memory, pipe, etc., to handle the synchronization problem. The operating systems usually adopt the mass schedule control mechanism of the multi-threading function, such as the POSIX thread database of the Linux, to manage the schedule.

However, meaningless switching of processes may occur in an operation system. Suppose that a process is accessing a piece of shared data. If another process also intends to access the shared data, it will persistently query whether the shared data is accessible. If the access request is refused, the operating system will switch to a further another process, and the query will repeat. Thus, the operating system will ceaselessly switch the processes without completing any task but waste a lot of CPU resources.

In the embedded system architecture, the synchronization problem is solved by a Library method or a special hardware. Similar to the operating systems, the Library method also has the advantages of programmability and modularization. The Library method outperforms the operating systems in the execution speed but lacks security and the support from other libraries. When adopting a special hardware to solve the synchronization problem, the embedded system is benefited by hardware in speed but impaired by hardware in flexibility and expandability.

Further, meaningless overload of bus traffic may occur in the embedded system. When many components are competing for an identical resource, they all send requests to the resource. However, only a single process is allowed to use the resource at a time. Thus, the other processes will persistently send requests to the bus. Then, the bus is overloaded, and other components needing to use the bus are blocked outside and forced to stand by. The synchronization hardwares used by the embedded systems have various specifications but lack a standard interface. Thus, a new system needs a new synchronization hardware, and a lot of time and resources are wasted thereon. Most synchronization hardwares are usually designed to only support few components at a time because they lack a standard interface. A synchronization hardware does not support the components having different interfaces.

Accordingly, the present invention proposes a multi-core SOC synchronization component to overcome the abovementioned problems.

SUMMARY OF THE INVENTION

One objective of the present invention is to provide a multi-core SOC synchronization component, which can handle data synchronization, schedule management and data sharing, whereby CPU has a higher usage rate and can manage schedules appropriately.

Another objective of the present invention is to provide a multi-core SOC synchronization component, which can function as a standard synchronization interface of components having different attributes or configurations.

A further objective of the present invention is to provide a multi-core SOC synchronization component, which has a function of expanding memory capacity for keys.

The present invention proposes a multi-core SOC synchronization component, which comprises a key administration module, a thread schedule unit and an expansion unit. The key administration module stores, distributes and manages keys. When the key is assigned to a data synchronization process, the key administration module supports the data synchronization process. When the key is assigned to a thread process, the thread schedule unit performs thread administration. The expansion unit is coupled to an external memory and able to expand the memory of the key administration module. When the keys are expanded or the internal memory is insufficient, the keys can be stored in the external memory.

From the embodiments described below, the features and advantages of the present invention should be obvious for the persons skilled in the art.

It should be noted that the foregoing schematic description and the following detailed description of the present invention is only to exemplify the present invention but not to limit the scope of the present invention.

DETAILED DESCRIPTION OF THE INVENTION

Figure 1:
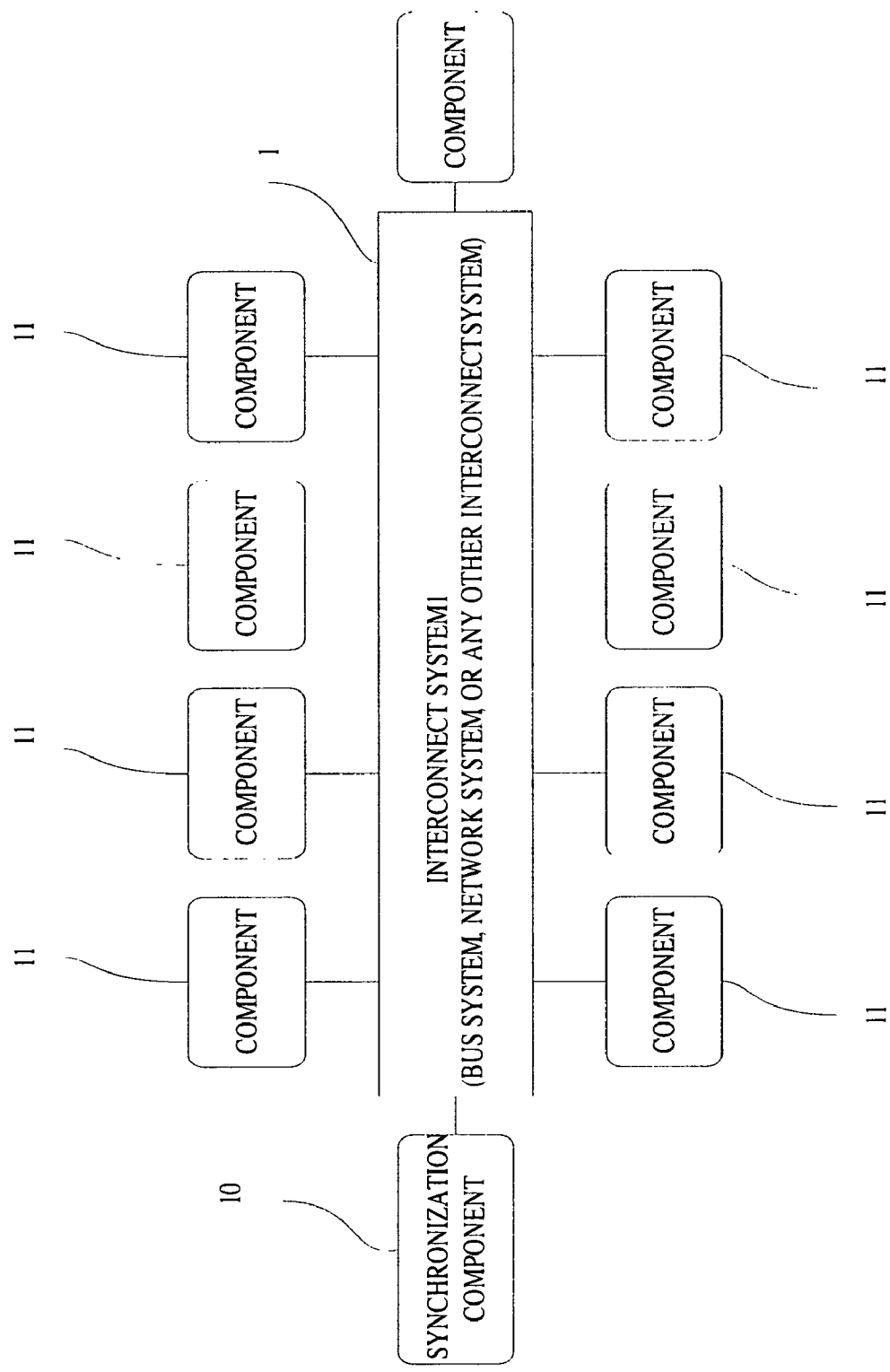
FIG. 1 is a diagram schematically showing that a synchronization component functions as a standard interface of an interconnect system according to the present invention.

The present invention discloses a multi-core SOC synchronization component, which applies to an interconnect system. As shown in FIG. 1, an interconnect system 1 connects with a synchronization component 10 and several different components 11, wherein the synchronization component 10 has a standard interface adaptive to components 11 different attributes or configurations.

Figure 2:
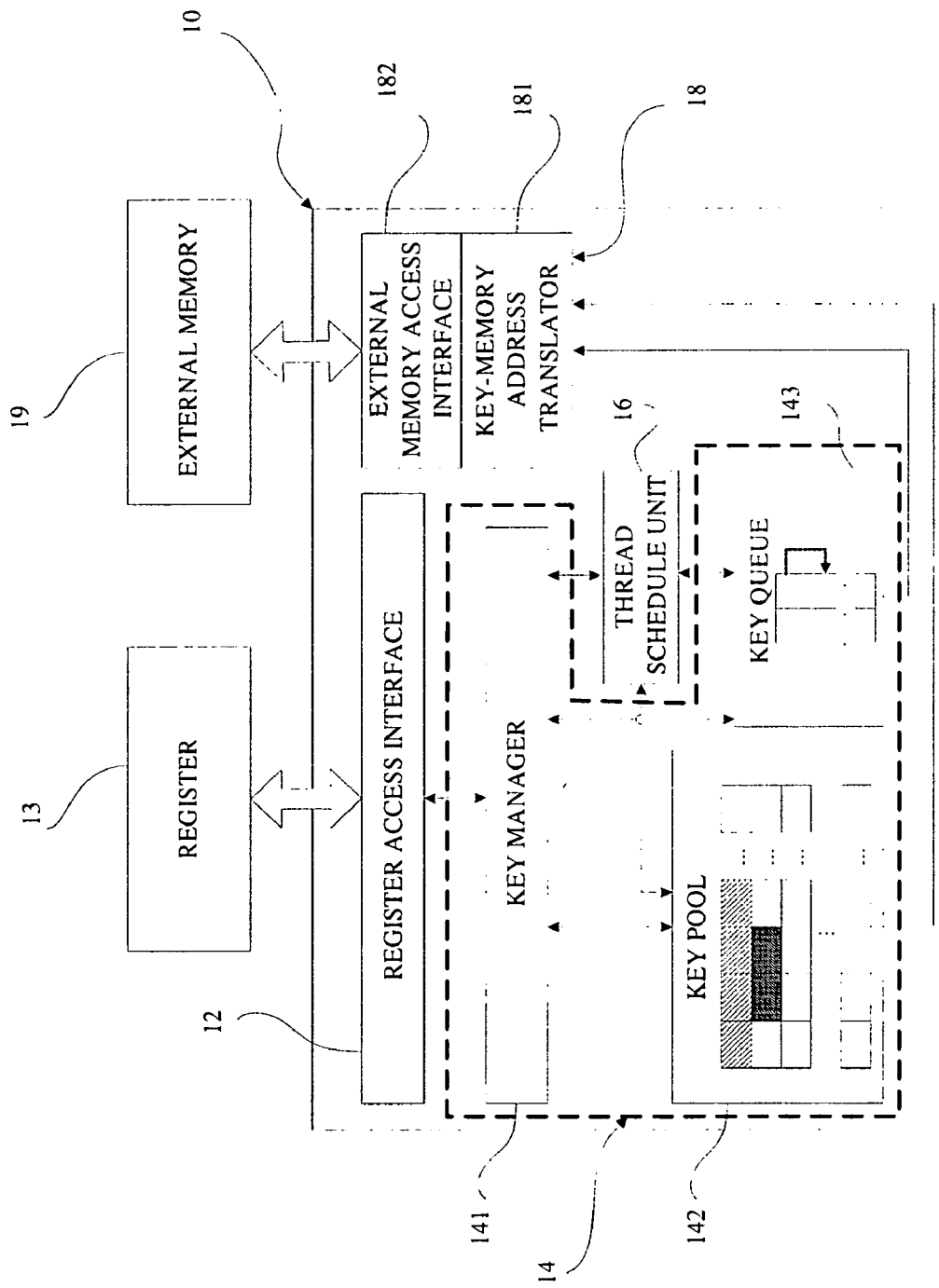
FIG. 2 is a block diagram of the architecture of a multi-core SOC synchronization component according to the present invention.

Refer to FIG. 2 for the architecture of a multi-core SOC synchronization component according to the present invention. The synchronization component 10 comprises a register access interface 12, a key administration module 14, a thread schedule unit 16 and an expansion unit 18. The register access interface 12 is coupled to at least one register 13, accesses the registers 13 with a memory mapping method and controls the synchronization component 10 via accessing the registers 13. In the memory mapping method, unique memory addresses are respectively assigned to all the registers; when a component uses its own memory access function to access one unique memory address, the component will be directed to access the corresponding register. The key administration module 14 is coupled to the register access interface 12. The key administration module 14 stores, distributes and administrates the keys. The key administration module 14 further comprises a key manager 141, a key pool 142 and a key queue 143. The key pool 142 stores keys. The key queue 143 supports data synchronization and threading. The key manager 141 uses the key pool 142 and the key queue 143 to distribute and administrate keys. The thread schedule unit 16 is coupled to the key administration module 14 and serves to administrate threads. The expansion unit 18 is coupled to the key administration module 14 and serves to expand the memory capacity of the key administration module 14. The expansion unit 18 further comprises a key-memory address translator 181 and an external memory access interface 182. The external memory access interface 182 is coupled to an external memory 19.

Figure 3:
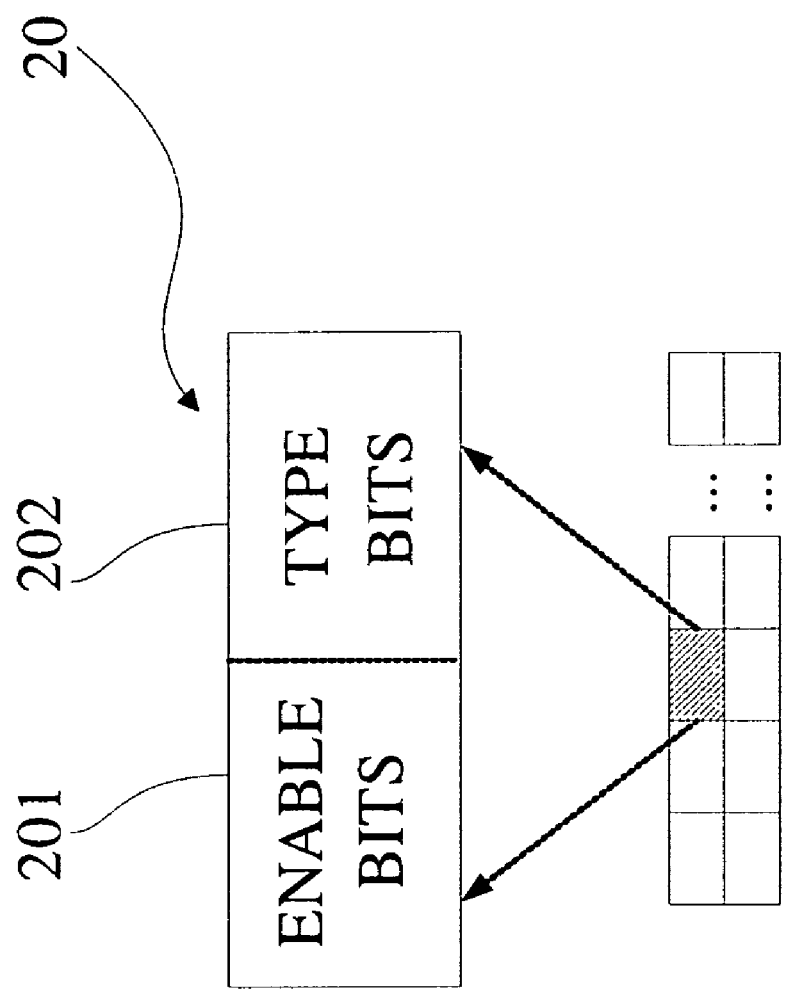
FIG. 3 is a diagram schematically showing the structure of a key according to the present invention.
Figure 4A:
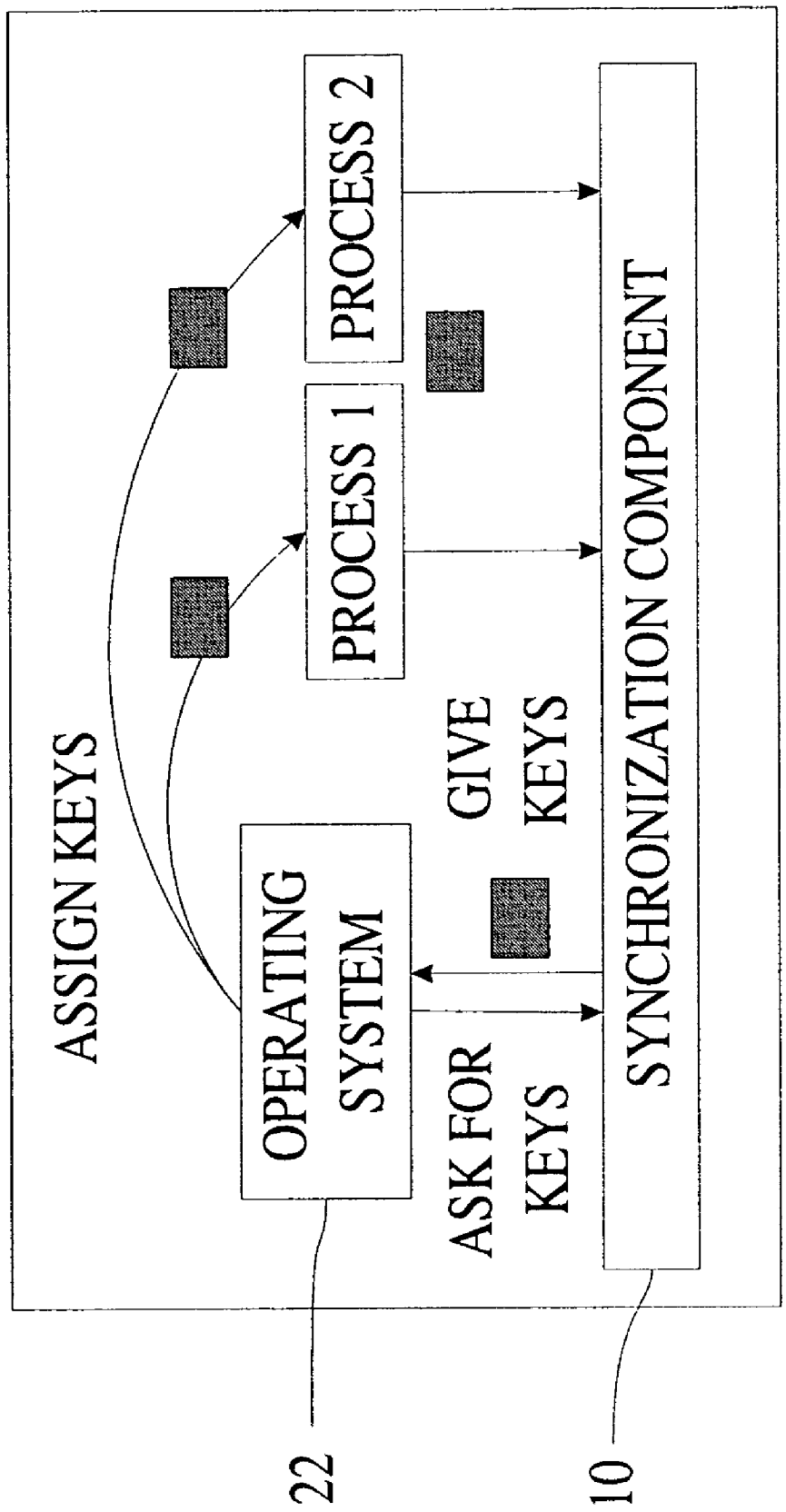
FIGS. 4(a)-4(d) are diagrams schematically showing the steps that a synchronization component undertakes a data synchronization process in SOC according to the present invention.
Figure 4B:
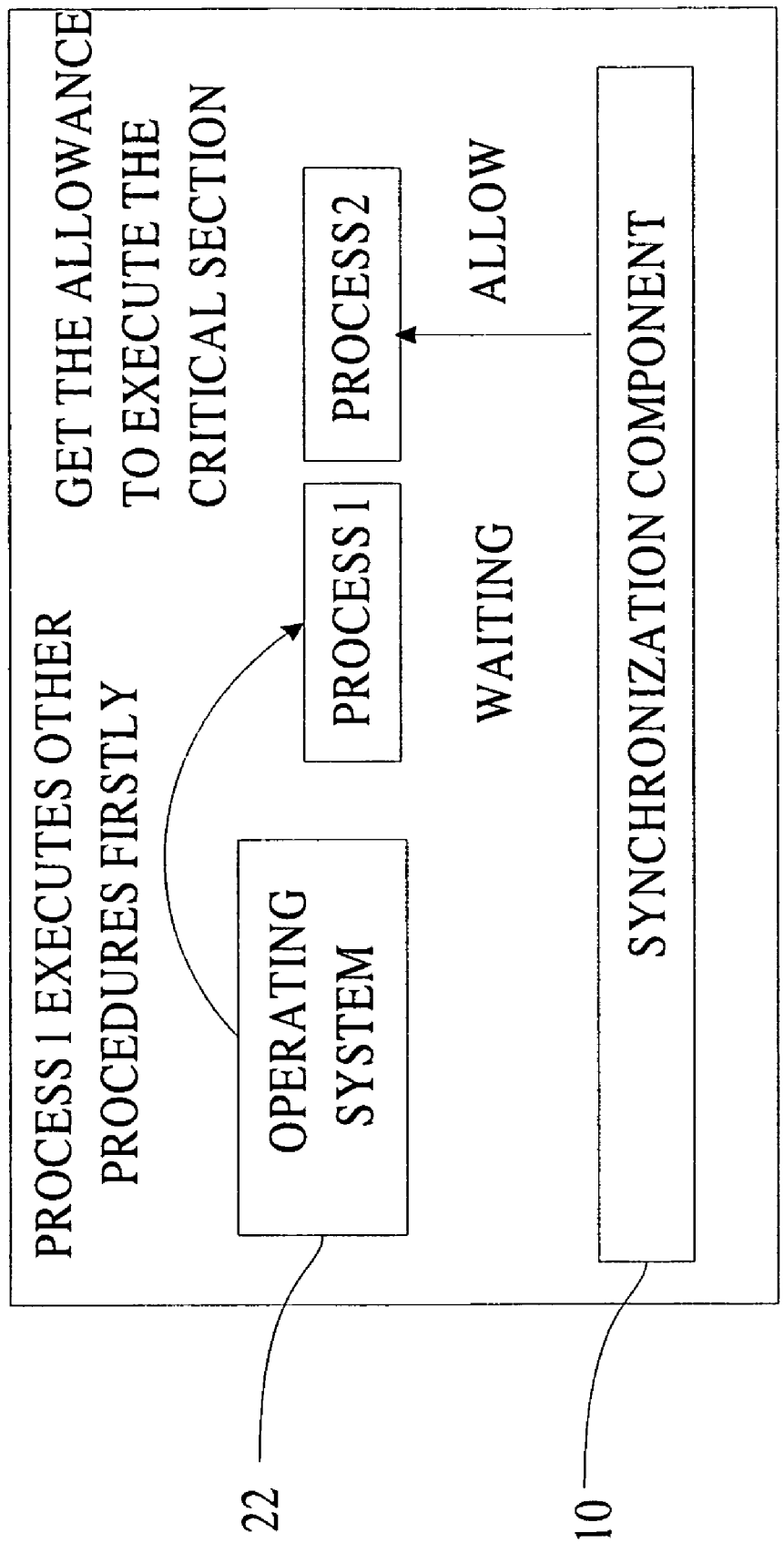
Figure 4C:
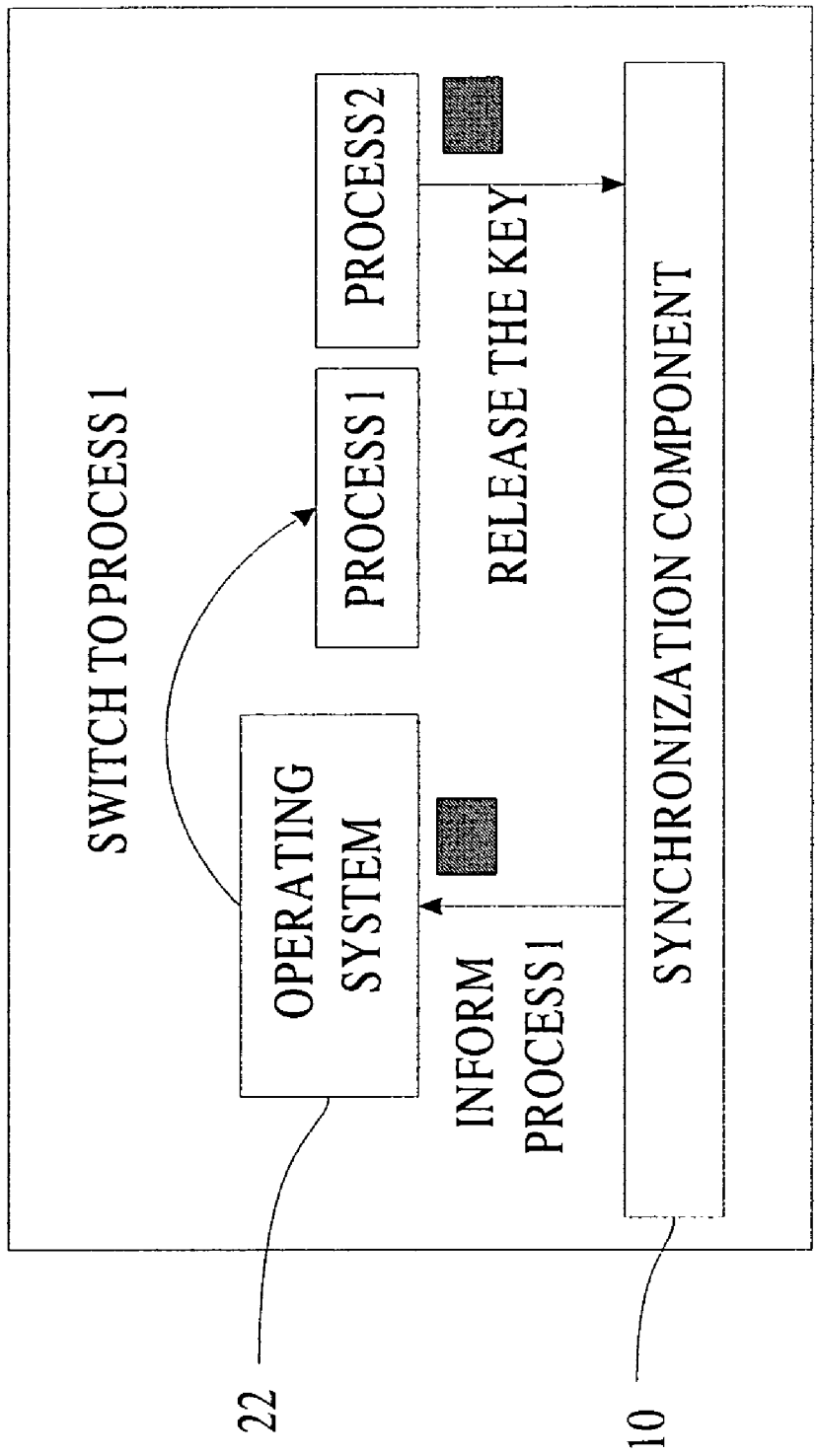
Figure 4D:
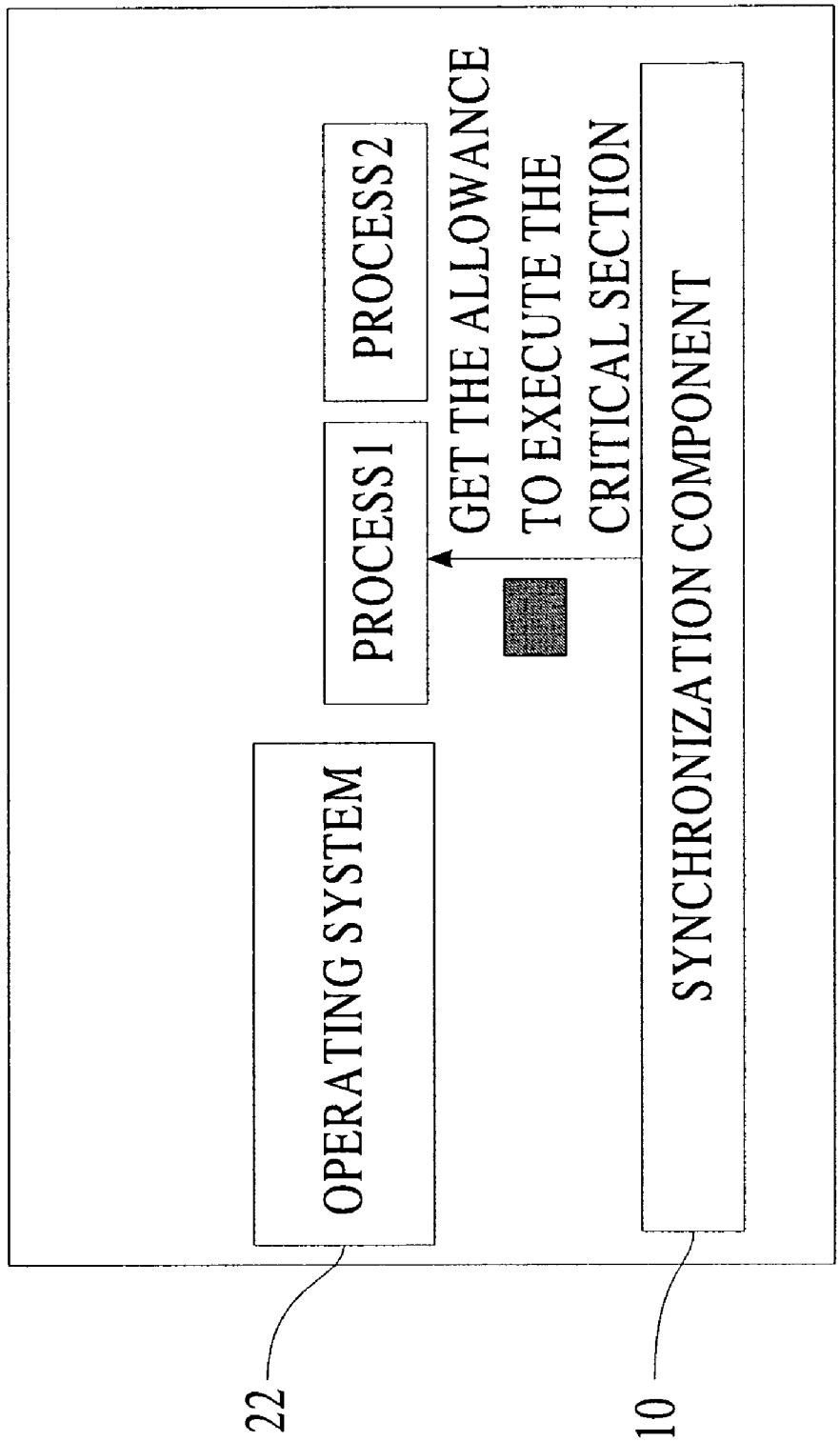

Refer to FIG. 3. A key 20 contains enable bits 201 and type bits 202. The enable bits 201 are used to verify whether the key 20 is in use. The type bits 202 are used to determine whether the key 20 is distribute to a data synchronization process or a threading process.

The operating system of the multi-core SOC executes the data synchronization process, including uses a key to determine whether a piece of data is accessible and uses a key to build a critical section of a program and determine whether the program is executable.

Below is described in detail the data synchronization process.

Refer to FIGS. 4(*a*)-4(*d*) for the steps that a synchronization component undertakes a data synchronization process in SOC according to the present invention. Refer to FIG. 4(*a*). In SOC, a process 1 and a process 2 intend to execute a program segment. However, the program segment can only be executed by a single process at a time. Thus, the operating system asks for keys from the synchronization component 10, and the synchronization component 10 gives keys to the operating system. Then, the operating system assigns the keys to the process 1 and the process 2. Next, both the processes 1 and 2 try to get the allowance from the key manager 141. The allowed party can execute a critical section. Refer to FIG. 4(*b*). The process 2 gets the allowance to execute the critical section. The processor 1 that does not get the allowance is substituted into the key queue 143. At this time, the process 1 can turn to execute other procedures firstly. Refer to FIG. 4(*c*) and FIG. 4(*d*). After the process 2 has finished its task and released the key to the synchronization component 10, the synchronization component 10 informs the process 1 via the operating system. Then, the process 1 acquires the key to execute the program segment in the critical section.

Thereby, the standby process is no more only busy waiting but may be switched to execute other procedures firstly until the key thereof is accepted. Then, the process is switched back to execute the program segment the process waiting for originally. Thus, the overall performance is promoted.

The operating system of the multi-core SOC also executes the threading process, including (1) Create—creates a new thread to different components, (2) Join—adds a thread and executes the thread once the execution of at least one assigned thread is completed, (3) Barrier—does not start to execute the added thread until the related thread has been executed to an identical point, and (4) Terminal—informs a standby thread that the execution of at least one assigned thread is completed.

Below is described in detail the threading process.

As the codes of the threads are identical with the keys, the administration of the threads is based on the administration of the keys. When a request enters and the key manager 141 finds that the incoming request belongs to threading, the request is transferred to the thread schedule unit 16. When the request is a request of "Create", the thread schedule unit 16 sends a key and an assigned memory address to an assigned component. After receiving the key, the assigned component accesses the assigned memory address to start a new thread. When the request is a request of "Join", the thread schedule unit 16 temporarily stores the code of the thread to the thread queue until the execution of at least one assigned thread is completed. Then, the thread is executed. When the request is a request of "Barrier", the thread schedule unit 16 temporarily stores the code of the thread to the thread queue until the related thread has sent out the related request. Then, the added thread starts to be executed simultaneously. When the request is a request of "Terminal", the thread schedule unit 16 sends the code of the thread to the key queue 143 for checking and informs the standby thread that the execution of at least one assigned thread is completed. Then, the process is restarted.

Figure 5:
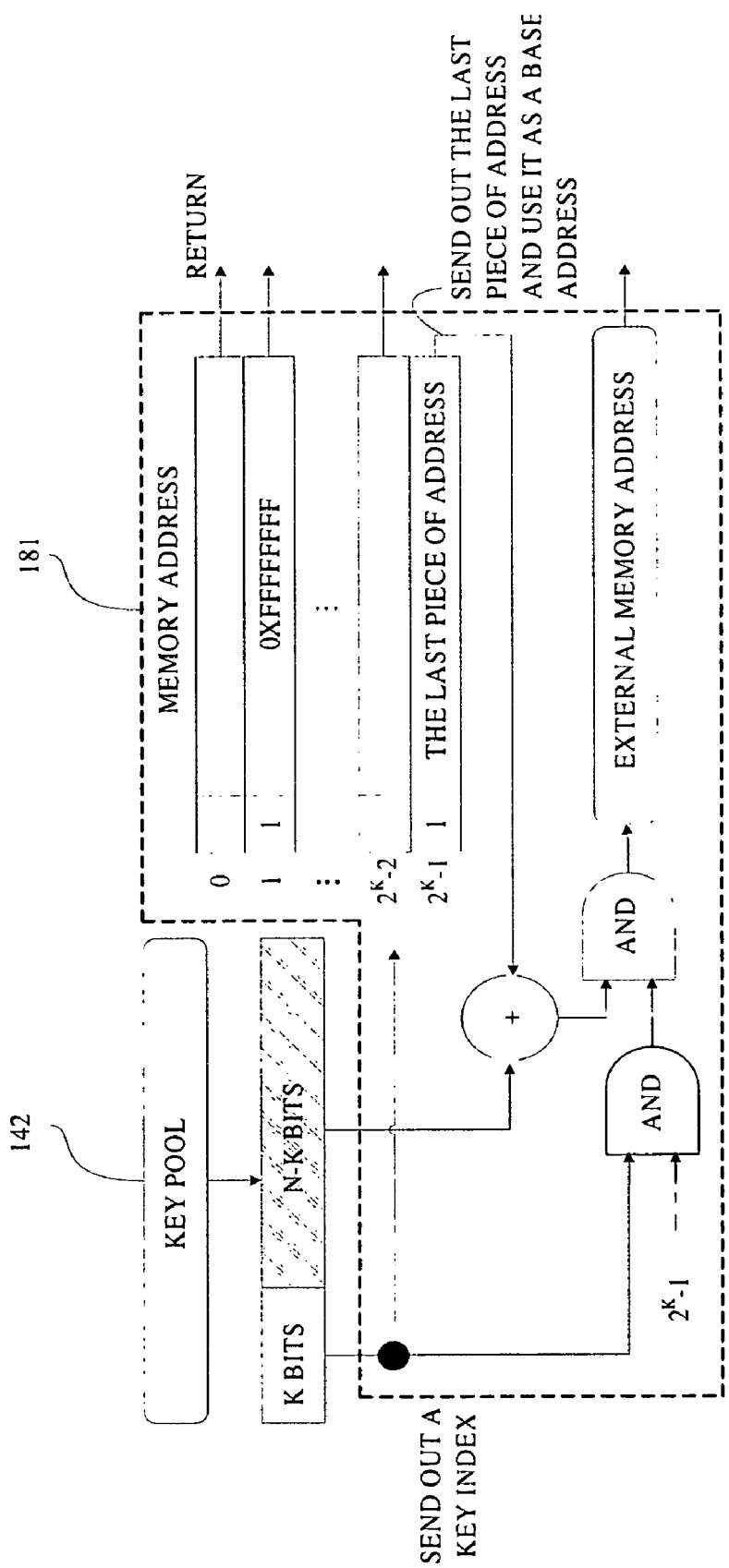
FIG. 5 is a diagram schematically showing the structure of a key-memory address translator according to the present invention.

The storage capacity of the key pool 142 is limited. Therefore, the synchronization component 10 uses the expansion unit 18 to expand the memory capacity of the key pool 142. Refer to FIG. 5 for structure of the key-memory address translator 181 of the expansion unit 19. Suppose that a key has a total length of N bits, and that the index for the internal memory (the key pool 142 and the key queue 142) needs k bits. When the key pool 142 sends out a key index, and if the index is sited within the internal memory, the value is returned. If the index is sited at the last piece of address of the memory, the last piece of address is sent out to function as a base address, and the rest (N-k) bits function as the offset value. Combining the base address and the offset value can attain the physical address where the key is to be stored in the external memory. Then, the key is stored in the external memory 19 via the external memory access interface 182.

In conclusion, the present invention utilizes the key pool and the key queue to implement data synchronization and thread administration. Thus are solved the problem that the persistent querying of the conventional software blocks the interconnect traffic and the problem that the special hardwares lack a standard interface. Thereby, the present invention can promote the performance and reliability of the system, decrease the complexity and time of system development, reduce the cost of software development, and increase the flexibility of system design and the space of software development.

The embodiments described above are to exemplify the technical contents and characteristics to enable the persons skilled in the art to understand, make, and use the present invention. However, it is not intended to limit the scope of the present invention. Any equivalent modification or variation according to the spirit of the present invention is to be also included within the scope of the present invention.

What is claimed is:

1. A synchronization component for a multi-core system-on-chip, comprising:
a key administration module storing, distributing and administrating keys, and supporting a data synchronization process when one of said keys is assigned to said data synchronization process;

a thread schedule unit coupled to said key administration module and administrating a threading process when one of said keys is assigned to said threading process; and an expansion unit providing for expand a memory capacity of said key administration module and coupled to an external memory, wherein said key contains enable bits and type bits; said enable bits are used to verify whether said key is in use, said type bits are used to determine whether said key is distributed to said data synchronization process or said threading process.

2. The synchronization component for a multi-core system-on-chip according to claim 1, wherein said synchronization component condition is a standard synchronization interface of components of different attributes or configurations.

3. The synchronization component for a multi-core system-on-chip according to claim 1, further comprising a register access interface coupled to said key administration module and at least one register.

4. The synchronization component for a multi-core system-on-chip according to claim 1, wherein said expansion unit further comprises a key-memory address translator and an external memory access interface coupled to said key-memory address translator and said external memory.

5. The synchronization component for a multi-core system-on-chip according to claim 1, wherein said key administration module further comprises:

a key pool storing said keys and supporting an expansion function of said expansion unit;

a key queue supporting data synchronization and thread administration; and a key manager using said key pool and said key queue to distribute and administrate said keys.

6. The synchronization component for a multi-core system-on-chip according to claim 1, wherein an operating system of said multi-core system-on-chip executes said data synchronization process and said threading process.

7. The synchronization component for a multi-core system-on-chip according of claim 6, wherein said data synchronization process executed by said operating system includes using said key to determine whether data is accessible.

8. The synchronization component for a multi-core system-on-chip according to claim 6, wherein said data synchronization process executed by said operating system includes using said key to build a critical section for a program and determine whether said program is executable.

9. The synchronization component for a multi-core system-on-chip according to claim 6, wherein said threading process executed by said operating system includes creating a new thread to different components.

10. The synchronization component for a multi-core system-on-chip according to claim 6, wherein said threading process executed by said operating system includes not executing an added thread until execution of at least one assigned thread is completed.

11. The synchronization component for a multi-core system-on-chip according to claim 6, wherein said threading process executed by said operating system includes executing an added thread until a related thread is executed to an identical point and then executing said added thread and said related thread simultaneously.

12. The synchronization component for a multi-core system-on-chip according to claim 6, wherein said threading process executed by said operating system includes informing a standby thread that execution of at least one assigned thread is completed.

* * * * *